B. F. JOSLYN.
Revolver.
No. 46,243.
Patented Feb 7, 1865.
Fig. 1
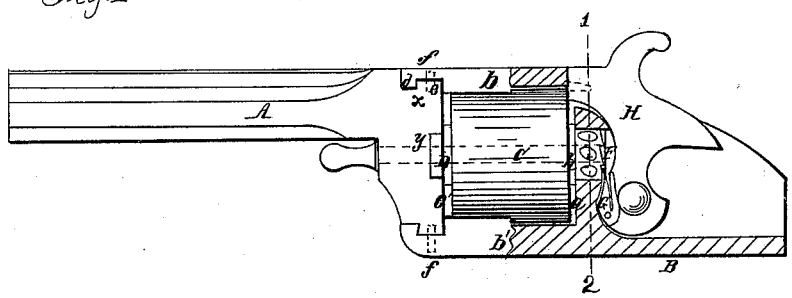
Fig. 2
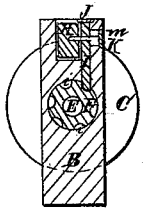
Fig. 7
Fig. 3
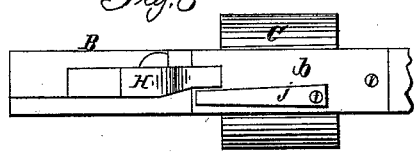
Fig. 4
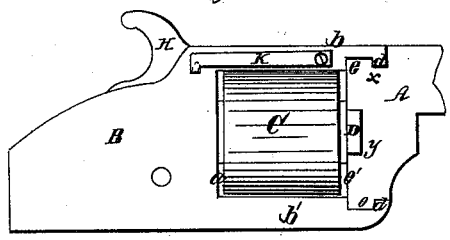
Fig. 5
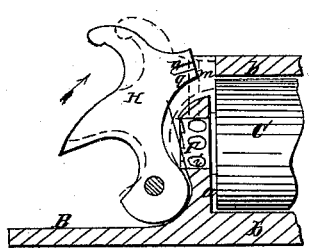
Fig. 6
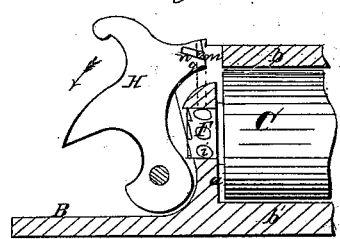
Witnesses:
Charles E. Foster
Chas. B. Price
Inventor:
Henry Howson
Atty for B. F. Joslyn

UNITED STATES PATENT OFFICE.

BENJAMIN F. JOSLYN, OF STONINGTON, CONNECTICUT.

IMPROVEMENT IN REVOLVING FIRE-ARMS.

Specification forming part of Letters Patent No. 46,243, dated February 7, 1865.

*To all whom it may concern:*

Be it known that I, B. F. JOSLYN, of Stonington, Connecticut, have invented certain Improvements in Revolving Fire-Arms; and I do hereby declare the following to be a full, clear, and exact description of the same, reference being had to the accompanying drawings, and to the letters of reference marked thereon.

My invention consists in a device, described hereinafter, for locking and unlocking the cylinder.

In order to enable others skilled in the art to make and use my invention, I will now proceed to describe its construction and operation.

On reference to the accompanying drawings, which form a part of this specification, Figure 1 is a side view, partly in section, of sufficient of a fire-arm to illustrate my improvements; Fig. 2, a transverse vertical section on the line 1 2, Fig. 1; Fig. 3, a plan view; Fig. 4, a side view the reverse of that shown in Fig. 1; Figs. 5 and 6, sectional views, illustrating part of my improvements; and Fig. 7, a view of the end of the hammer.

Similar letters refer to similar parts throughout the several views.

A represents the barrel, B the frame-work, and C the cylinder, of my improved revolver. The opening for the reception of the cylinder is bounded above by the projection $b$ of the frame, below by the projection $b'$, at the rear by the vertical portion $a$ of the frame, and in front by the rear end of the barrel.

The frame and barrel are firmly secured to each other in the following manner:

The projection $b$ of the frame has a lip, $d$, which fits into a recess in the barrel near the end of the same, and at the end of the barrel is a projection, $e$, which fits into a recess formed in the under side of the projection $b$ of the frame, the point $x$ of junction of the projection $e$ of the barrel with the lip $d$ of the projection $b$ being inclined or dovetailed. Projections and recesses of a similar character are formed on the projection $b'$ of the frame and on the lower portion of the rear end of the barrel. When the several projections and recesses have been properly formed the end of the barrel is driven laterally between the two projections $b$ and $b'$ of the frame when the latter and the barrel are dovetailed, and thereby firmly secured to each other, as seen in Fig. 1. Additional security is applied by the set-screws $f$, (shown by dotted lines, Fig. 1,) one of which passes through each projection of the frame and screws into the barrel.

In the rear end, $e$, of the barrel is a transverse slot, $y$, into which that portion of the washer D which is smallest in diameter fits snugly but freely the portion of the washer which is largest in diameter intervening between the front end of the cylinder C and rear end, $e$, of the barrel, through which, as well as though the washer and the cylinder, passes the cylinder-pin E.

At the rear end of the cylinder is a cylindrical projection, F, which fits and turns in the vertical portion $a$ of the frame, against which bears the collar $h$.

In the surface of the cylindrical projection F are as many indentations $i$ as there are chambers in the cylinder, and at the rear end of the same projection are formed a similar number of the usual teeth, into which the dog G on the hammer H engages.

A vertical pin, I, passes through and is guided by an opening in the frame, the lower end of the pin being formed for engaging into the indentation $i$ of the projection F of the cylinder, the upper end of the pin being acted on by a spring, $j$, secured to the top of the projection $b$ of the frame. A horizontal pin, $m$, Fig. 2, passes through and fits loosely in the vertical pin I, and is acted on by a spring, K, Fig. 4, secured to one side of the projection $b$ of the frame, the other end of the pin being arranged to pass into a recess, $n$, formed in one side of the front end of the hammer H, which will be best observed on reference to Fig. 7, one side of the hammer below this recess and designated by the letter $q$ being bevelled. When the hammer is down the pin $m$ is in the slot $n$, and the lower end of the vertical pin I in one of the indentations $i$ of the projection F of the cylinder, which is consequently locked. On drawing the hammer back, however, as seen in Fig. 6, the lower edge of the recess $n$ acting on the pin $m$ draws the vertical pin I upward and free from the indentations $i$ in the projection F, so as to permit the cylinder to be revolved by the dog G. When the cylinder has been moved to the desired distance, however, the pin $m$ is freed from the recess $n$, and the vertical pin I acted on by the spring $j$ instantly drops and locks the cylinder. When the trigger is pulled after cocking the hammer the beveled end of the pin $m$ will be struck by the inclined portion $q$ of the hammer, which causes the pin to recede momentarily; but the instant the hammer reaches the limit of its forward movement the pin by the action of the spring K takes its place in the recess $n$ of the hammer. It will thus be seen that the cylinder continues to be locked, excepting during the short period necessary for the dog G to impart to it the desired limited movement on the cocking of the hammer.

I claim as my invention and desire to secure by Letters Patent—

The rod I and its transverse rod $m$, in combination with the recessed and inclined end of the hammer, the whole being arranged and operating for the locking and unlocking of the cylinder, substantially as and for the purpose herein set forth.

In testimony whereof I have signed my name to this specification in the presence of two subscribing witnesses.

BENJAMIN F. JOSLYN.

Witnesses:
N. B. PALMER, 2d,
WM. J. H. POLLARD.